(12) United States Patent
Engedal (10) Patent No.: US 10,033,985 B2
(45) Date of Patent: Jul. 24, 2018

(54) CAMERA POSE ESTIMATION APPARATUS AND METHOD FOR AUGMENTED REALITY IMAGING

(71) Applicant: Apple Inc., Cupertino, CA (US)

(72) Inventor: Torbjorn Engedal, Kristiansand (NO)

(73) Assignee: Apple Inc., Cupertino, CA (US)

( * ) Notice: Subject to any disclaimer, the term of this patent is extended or adjusted under 35 U.S.C. 154(b) by 1081 days.

(21) Appl. No.: 13/900,158

(22) Filed: May 22, 2013

(65) Prior Publication Data

US 2013/0335529 A1 Dec. 19, 2013
US 2017/0070724 A9 Mar. 9, 2017

Related U.S. Application Data

(63) Continuation of application No. 12/601,188, filed as application No. PCT/NO2008/000178 on May 22, 2008, now Pat. No. 8,452,080.

(30) Foreign Application Priority Data

May 22, 2007 (NO) .................................. 20072616

(51) Int. Cl.
| | | |
|---|---|---|
| *G06K 9/36* | (2006.01) |
| *H04N 13/00* | (2018.01) |
| *H04N 13/02* | (2006.01) |
| *G06T 7/73* | (2017.01) |
| *G06T 7/246* | (2017.01) |

(52) U.S. Cl.
CPC ......... *H04N 13/0203* (2013.01); *G06T 7/251* (2017.01); *G06T 7/75* (2017.01); *G06T 2207/10016* (2013.01); *G06T 2207/30244* (2013.01)

(58) Field of Classification Search
None
See application file for complete search history.

(56) References Cited

U.S. PATENT DOCUMENTS

| | | |
|---|---|---|
| 4,950,455 A | 8/1990 | Smith |
| 5,850,469 A | 12/1998 | Martin et al. |

(Continued)

FOREIGN PATENT DOCUMENTS

| | | |
|---|---|---|
| DE | 102005025470 | 12/2006 |
| JP | 2002032741 | 1/2002 |

(Continued)

OTHER PUBLICATIONS

Fua et al., "Stable Real-Time 3D Tracking Using Online and Offline Information", Transactions on Pattern Analysis and Machine Intelligence, vol. 26, No. 10, Oct. 1, 2004 pp. 1385-1391.*

(Continued)

*Primary Examiner* — Tsion B Owens
*Assistant Examiner* — Alison Slater
(74) *Attorney, Agent, or Firm* — Blank Rome LLP (57) ABSTRACT

An apparatus for providing an estimate for a 3D camera pose relative to a scene from 2D image data of a 2D image frame provided by the camera is provided, the apparatus using four types of observations: (a) detected 2D-3D point correspondences; (b) tracked 2D-3D point correspondences; (c) motion model observations; and (d) edge observations.

20 Claims, 7 Drawing Sheets

(56) References Cited

U.S. PATENT DOCUMENTS

| | | |
|---|---|---|
| 6,571,024 B1 | 5/2003 | Sawhney |
| 6,765,569 B2 | 7/2004 | Neumann |
| 7,023,536 B2 | 4/2006 | Zhang et al. |
| 7,038,846 B2 | 5/2006 | Mandella |
| 7,088,440 B2 | 8/2006 | Buermann et al. |
| 7,110,100 B2 | 9/2006 | Buermann et al. |
| 7,113,270 B2 | 9/2006 | Buermann et al. |
| 7,161,664 B2 | 1/2007 | Buermann et al. |
| 7,203,384 B2 | 4/2007 | Carl |
| 7,268,956 B2 | 9/2007 | Mandella |
| 7,391,888 B2 | 6/2008 | Hu et al. |
| 7,474,809 B2 | 1/2009 | Carl et al. |
| 7,518,636 B2 | 4/2009 | Endo |
| 7,519,218 B2 | 4/2009 | Takemoto |
| 7,706,603 B2 | 4/2010 | Najafi et al. |
| 7,729,515 B2 | 6/2010 | Mandella et al. |
| 7,826,641 B2 | 11/2010 | Mandella et al. |
| 7,961,909 B2 | 6/2011 | Mandella et al. |
| 8,095,237 B2 | 1/2012 | Habibi et al. |
| 2002/0191862 A1 | 12/2002 | Neumann et al. |
| 2003/0012410 A1 | 1/2003 | Navab |
| 2003/0055335 A1 | 3/2003 | Sauer |
| 2003/0174773 A1* | 9/2003 | Comaniciu ............ H04N 19/23 375/240.08 |
| 2004/0175039 A1 | 9/2004 | Miller |
| 2004/0190775 A1 | 9/2004 | Miller |
| 2005/0078178 A1 | 4/2005 | Brown |
| 2005/0168437 A1 | 8/2005 | Carl et al. |
| 2006/0094955 A1* | 5/2006 | Satoh ...................... G01S 5/163 600/426 |
| 2006/0187034 A1* | 8/2006 | Styers ...................... G05B 9/02 340/545.1 |
| 2006/0188131 A1 | 8/2006 | Zhang |
| 2006/0233423 A1 | 10/2006 | Najafi |
| 2007/0122001 A1* | 5/2007 | Wang ................. G06K 9/00208 382/103 |
| 2010/0232727 A1* | 9/2010 | Engedal ................ G06T 7/0046 382/285 |
| 2011/0227915 A1 | 9/2011 | Mandella et al. |
| 2012/0038549 A1 | 2/2012 | Mandella et al. |
| 2013/0194418 A1 | 8/2013 | Gonzalez-Banos et al. |

FOREIGN PATENT DOCUMENTS

| | | |
|---|---|---|
| JP | 2003281504 | 10/2003 |
| JP | 2005308699 | 11/2005 |
| JP | 2006227932 | 8/2006 |
| JP | 2006252275 | 9/2006 |
| JP | 2010116359 | 5/2010 |

OTHER PUBLICATIONS

Zhengyou Zhang, "M-estimators", Thu Feb. 8, 2011:42:20 MET 1996, entire document.*

Fua et al., "Stable Real-Time 3D Tracking Using Online and Offline Information", Swiss Federal Institute of Technology (EPFL), 2004 pp. 1-11.*

Japanese office action for JP2013-078439 dated Feb. 26, 2014.

Fua et al. "Stable Real-Time 3D Tracking Using Online and Offline Information", Transactions on Pattern Analysis and Machine Intelligence, vol. 26, No. 10, Oct. 1, 2004, pp. 1385-1391.

Gao et al., "Complete Solution Classification for the Perspective-Three-Point Problem," IEEE Trans. on PAMI, vol. 25, No. 8, Aug. 2003.

Horn, Closed Form Solutions of Absolute Orientation Using Unit Quaternions, JOSA-A(4), No, 4, Apr. 1987, pp. 629-642.

Lepetit, "Selected Topics in Computer Vision," http://cvlab.epfl.ch/teaching/topics/lectures_pdfs/stcv_lecture1.pdf 2005.

Lepetit et al., "Fully Automated and Stable Registration for Augmented Reality Applications," Mixed and Augmented Reality, Oct. 7, 2003, pp. 93-102.

Lepetit et al., "Randomized Trees for Real-Time Keypoint Recognition," Conference on Computer Vision and Pattern Recognition, Jun. 2005.

Vacchetti et al., "Fusing Online and Offline Information for Stable 3D Tracking in Real-Time," 2003 IEEE Computer Society Conference on Computer Vision and Pattern Recognition, vol. 2, Jun. 18, 2003, pp. 241-248.

Vacchetti et al., "Stable Real-Time AR Framework for Training and Planning in Industrial Environments," Virtual Reality and Augmented Reality Applications in Manufacturing, Jan. 1, 2004, pp. 125-142.

Z. Zhang, "A flexible new technique for camera calibration," IEEE Transactions on Pattern Analysis and Machine Intelligence, 22(11):1330-1334, 2000.

Zhang et al., "A Robust Technique for Matching Two Uncalibrated Images Through the Recovery of the Unknown Epipolar Geometry," INRIA, May 1994.

* cited by examiner

CAMERA POSE ESTIMATION APPARATUS AND METHOD FOR AUGMENTED REALITY IMAGING

This application is a continuation of U.S. patent application Ser. No. 12/601,188 filed Apr. 26, 2010, which is a national stage application of PCT Application No. PCT/NO2008/000178 filed on May 22, 2008 which claims priority to Norway Application No. 20072616 filed May 22, 2007.

BACKGROUND OF THE INVENTION

1. Technical Field

The present invention relates to the field of imaging, and particularly to determining the pose of a camera in respect of a scene from information provided by an image of the scene captured by the camera and the predetermined position of known features of the scene.

2. Background Information

The problem to be solved is to estimate the pose of a physical camera based on a real-time or recorded sequence of images. The motivation for finding the physical camera pose, is to be able to insert virtual objects into the image-stream in real-time, thereby obtaining an augmented reality effect. A typical setup is a user wearing head mounted displays (HMD) and camera, where images from the camera are used to reconstruct the pose of the camera and thus the pose of the HMDs. The pose is then used to correctly align virtual objects on the screen of the HMDs, either on top of the camera image (video-see-through), or on top of an optical see-through screen, to make the virtual objects/elements, that is, objects or elements not actually present in the real scene imaged by the camera, appear as real-life objects in the real surroundings of the user.

Prior art solutions to the problem are known to suffer either from not being capable of real-time use or because of slow or ineffective methods or algorithms used to determine in real-time the camera pose from the camera image, or from other shortcomings such as inaccuracies, such as low repeatability, in the results obtained, drifting, non-usable recovery of pose, or non-robust pose estimation.

2.1 Tracking Using a Known 3D Model of the Environment

Generally, frame-to-frame tracking methods suffer from drifting and (in practice) non-usable recovery of pose-methods. With only small camera movements, frame-to-frame tracking might work well, but in real-life scenarios where users are given control over the camera, this is a restriction that cannot be applied in practise.

In a practical world, where unlimited processing power or unlimited frame rate is not available, frame-to-frame tracking is generally known also to suffer from losing track. If the camera moves too much, the next frame will not contain enough feature points that can be matched against feature points in the previous frame to perform pose estimation. Moving the camera fast will result in a blurred new frame (motion blur), which also reduces the number of feature points in the previous frame that are reliably matched in the new frame. If the tracking loses its pose, there must be a pose recovery method implemented to reinitialize the tracking. Various methods have been suggested and published, however, most of them force the user to move and/or rotate the camera to a specific position and/or direction in order to recover the pose and to reinitialize the tracking. Even if a suitable recovery method is implemented, frame-to-frame tracking is known to suffer from drifting.

US 2002/0191862 A1 (U.S. Pat. No. 6,765,569 B1) discloses a method where the user needs to start use of the system by looking, that is, by pointing the camera, in a certain direction, and the system expands the possible working area during use. The method disclosed using a method similar to frame-to-frame tracking, but it does not use a prior-known 3D model, which means that it relies on triangulating feature point position in a subsequent frame to find the 3D position of feature points. The method stores 3D information of feature points during use, and refines the 3D position each time a feature point is detected, based on triangulation. When the refinement of the 3D position has reached a satisfactory level, the feature point is regarded as calibrated. This reduces the drifting issues somewhat, but in practice there is still severe drifting when moving far away from the starting point. An accurate determination of new feature points rely on accurate estimation of 3D position of previous 3D feature point positions, which again relies on accurate estimation of previous camera poses.

It is well known that there always will be some amount of numerical and mathematical error added in every calculation/estimation of the above proposed method. This means that feature points that are far away from the starting point will have large errors due to drifting. On top of that, if the 3D position of one single feature point is regarded as "calibrated", and this position is actually wrong, then the further tracking and calibration of feature points will be affected by an even larger error.

In addition, it is required that the user moves in certain ways to ensure accurate estimation and refining of the 3D positions of the feature points, which in practice results in a cumbersome and hard-to-use system. U.S. Pat. No. 6,765,569 B1 includes a disclosure of a method for pose recovery if there are not enough feature points identified in an image, but this method still relies on having the user look in a direction where there are feature points that have been estimated satisfactorily, such that they can be considered "calibrated" feature points. The method does not use a 3D model of the environment that may be observed by the camera, which means that it computes 3D positions of the feature points while running by triangulation in subsequent frames.

2.2 Local Detection and Matching of Feature Points (Detection)

A good way of removing the problems of drifting and lost pose is to use a method where the system is trained based on feature points of the environment/object/scene before using the system in runtime. Training-/classification-information stored together with 3D positions makes it possible in real-time to match feature points detected in the current frame, against the ones stored in a database or classified through a classifier. When a sufficient number of feature points match, it is possible to estimate the physical camera pose through geometrical calculations. Further refinements can be obtained through numerical minimizations. This can be performed in every single frame without depending on the result of estimations in previous frames. In practice this means that "pose recovery" is performed in every single frame.

Drifting and lost pose will not be an issue in detection, as long as enough feature points are classified or matched against the contents of a keypoint database. However this kind of method is known to suffer from false detections, meaning that feature points detected in real-time are falsely classified or matched to feature points stored in the database. Some methods for estimating the camera pose can deal with a certain number of false matches (also called outliers), but either way the final result of the estimated pose will typically suffer from low repeatability, even with few outliers. A typical scenario of such detection methods is that there are at least 15 outliers. This generally results in low repeatability, even when the camera is kept completely still. The effect of the aforementioned problem in an augmented reality system is that the virtual objects are not kept in place, but appear to be bouncing around, jittering, etc.

US 2006/0233423 A1 suggests a method for matching real-time feature points against a database, and for training/storing relevant information about the calibrated/trained feature points. In relation to what has been described above, the method suggested can be considered to be a detection method.

The disclosure "Randomized Trees for Real-Time Keypoint Recognition" by V. Lepetit, P. Lagger and P. Fua published accepted to Conference on Computer Vision and Pattern Recognition, San Diego, Calif., June 2005 describes an earlier but similar method to what is disclosed by US 2006/0233423 A1 for detecting objects in single frames. Instead of using a database, the use of "Classification trees" (see Chapter 0 below) is proposed. The classification trees are built in a training phase, and at runtime each keypoint is "dropped down" multiple trees, and finally the keypoint is matched with a certain score (confidence). Even this method shows the strengths and weaknesses of a detection method.

2.3 Recorded Image Streams

Numerous other methods and algorithms have been published and patented for estimating the pose of a physical camera based on recorded image streams. Estimating the pose of a physical camera based on recorded image streams means that the method needs all or several images of the stream to be available "forward" and "backward" in time to be able to compute the camera pose of the "current" frame. In movie production several such methods have been patented and published, but, as mentioned earlier, in this category the methods do not run in real-time, and they rely on a complete image stream to yield satisfactory result. Their intended use is not real-time augmented reality, but visual post-production effects of "Hollywood movies".

SUMMARY OF THE INVENTION

The apparatus and method of the present invention provides a combination of the strengths of frame-to-frame tracking with a 3D model and the strengths of local feature points detection and matching to obtain physical camera pose estimation with satisfactory accuracy, robustness and repeatability. The problems of drifting, loss of track and jittering, such as due to false matches, are removed by combining the strengths of detection and tracking into an innovative and unique method and apparatus. By combining detection and tracking the risk of implementing a solution that is too slow for real-time use is obviated, and the apparatus and method of the present invention presents a unique opportunity to split up sub-tasks into multiple threads and thread-tasks to ensure a fast and efficient implementation, in particular on multi-CPU systems. On today's computers, technology incorporating multiple CPUs and dual core CPUs has become available and affordable to the general public, which is well suited for implementing the solution provided by the present invention. Some key advantages of the solution provided by the present invention are, numbered by "steps", as follows:

1. Robust estimation through local detection and matching of feature points, meaning "recovery of pose" in every frame, not relying on estimations in previous frame.

The solution provided by the present invention is advantageously implemented by the use the method disclosed by V. Lepetit, P. Lagger and P. Fua in "Randomized Trees for Real-Time Keypoint Recognition", accepted to Conference on Computer Vision and Pattern Recognition, San Diego, Calif., June 2005.

2. Accuracy and repeatability through frame-to-frame tracking is obtained by using a combination of previously estimated pose and a 3D model of the environment.

The solution provided by the present invention also introduces a new idea to general frame-to-frame tracking: the last successfully computed pose is stored and used for tracking, which means that even if the camera pose was not successfully computed in previous frame, the solution provided by the present invention tries to perform tracking based on the latest successful pose. This makes the solution provided by the present invention able to re-initialize the pose estimation even if the Detection method presented in step 1 above should fail, and even if the final pose failed in several previous frames. This new idea will however require that the user moves back to a position/orientation close to where the last pose estimation was successful.

3. Motion model observations included in the input parameters to the numerical minimizations for estimating the camera pose further enhances accuracy and repeatability.

4. Robust computation through "robust estimators" reduces the effect of outliers. We use a Tukey estimator, but others can be used.

5. Unrivalled speed and performance through our unique parallel processing algorithm.

DETAILED DESCRIPTION OF THE INVENTION

3.1 System Overview

Figure 6:
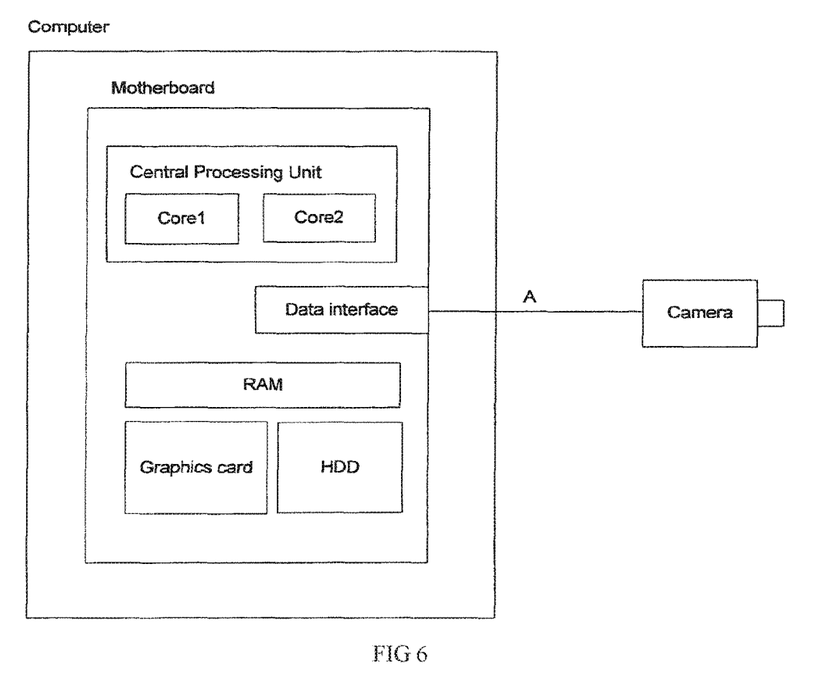
FIG. 6 is a diagrammatic illustration of a standard computer with a dual-core Central Processing Unit, Random Access Memory, Graphics Card and Hard Drive mounted to the motherboard.

FIG. 6 illustrates a standard computer with a dual-core Central Processing Unit (CPU), Random Access Memory (RAM), Graphics Card, Hard Drive (HDD) mounted to the motherboard, which is adapted for implementation of the present invention. Further, there is Data interface that connects the camera to the computer. The camera has a lens for capturing images of the real environment, such as a scene of interest. The images are digitized on a sensor, typically a CCD or a CMOS sensor. Images are typically pre-stored in the camera's internal memory and then transferred to the computer through connection A, interpreted by the Camera interface, which again communicates the images to the motherboard into a purposely allocated area in the system RAM.

The CPU can typically be an Intel Core 2 Duo. Our system can also use a single-core CPU, but then performance will be lower. The RAM can typically be standard 512 MB DDR2 SDRAM. The Hard Drive can typically be a standard 40 GB SATA 7200 RPM hard drive. The Data interface can typically be USB 2.0, FireWire IEEE 1394, Wireless LAN (WLAN) or other. Connection A might be wired or wireless, depending on the Data interface.

The software is stored on the hard drive (HDD) in machine-readable code and is loaded into RAM when execution starts. Images are captured using the camera, and then transferred over connection A into a memory area in RAM. Algorithms are then run on the images stored in RAM using 1 or more CPUs or Cores of CPUs. The result of the algorithms is an estimated pose of the physical camera, which is used to draw virtual objects on top of the captured image, correctly aligned with the real environment. The image and/or the virtual object(s) are then rendered typically in the Graphics card, and the result is displayed on a screen. The screen can be a transparent screen (images projected to mirror, glass etc) or an opaque screen. In the case of an opaque screen, the image captured by the camera needs to be drawn as a background before rendering the virtual objects, to obtain an Augmented Reality effect. The screen might be a head-mounted display, together with the camera mounted in front of the head-mounted display. Other displays with camera mounted in front might be PDAs, mobile phone displays (where in the future the internal computer of the mobile phone might be used for processing), a tablet PC display or other.

Today's powerful graphics cards also allow execution of mathematical operations on the GPUs (Graphical Processing Unit), which means that the tasks and algorithms of our system might also be performed on the GPUs in addition to the CPUs/cores. Even Physics cards like Ageia PhysX might be used for performing tasks in our software

3.2 Software Implementation

The apparatus and methods of the invention, in part described in this chapter as algorithms, can advantageously be implemented in any kind of computer software environment, advantageously where the basic mathematical methods are available. If the basic mathematical methods are not available, they can be implemented from scratch. MATLAB, FORTRAN, C/C++, C# etc. are suitable programming languages. The software may be implemented on a computer running a Linux operating system, Windows, Unix, Xbox, Playstation, Symbian etc.

The necessary mathematical methods, are among others, but not limited to, numerical minimization, basic computer vision algorithms like filters, edge detection, corner detection etc, methods for matrix operations (matrix inverse, transpose, multiply etc).

3.3 Main Loop Overview

Figure 1:
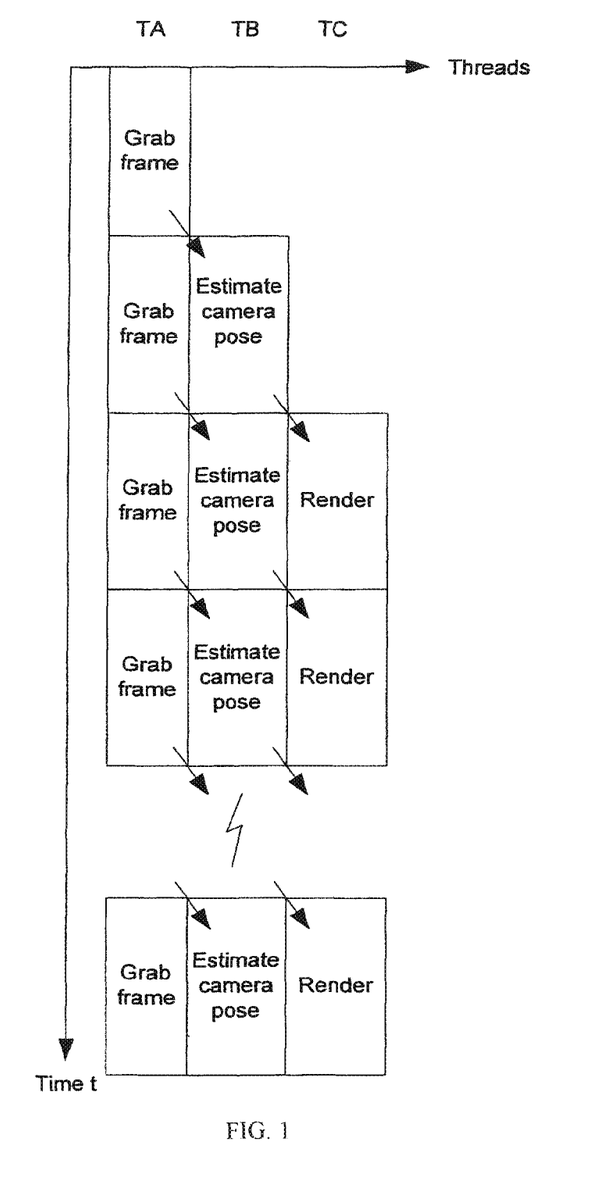
FIG. 1 is a flow chart illustrating the main loop of a computer implementation of the present invention.

In what is herein referred to as the main loop of an exemplary system implementation of the invention, such as in a computer implementation of the invention, such as illustrated by the accompanying FIG. 1, live images are extracted from the camera and stored in a circular memory buffer in system RAM, camera pose is estimated and finally the result is rendered to screen.

As soon as the first frame has been grabbed, and the pose estimation task has started, thread A starts grabbing a new frame. As soon as the first pose estimation is finished, if the new frame has been grabbed in parallel, the estimation of camera pose in the new frame can start. As soon as the first rendering is finished, a new render can start when a new frame and camera pose is available from thread A and B, This means that thread A works in parallel with thread B and C, retrieving fresh frames that thread B can use as soon as it is finished with its previous task. The same goes for thread B, it works in parallel to thread C, estimating fresh camera poses that thread. C uses as soon as it is finished with its previous render. This setup provides a very effective way of utilizing computers with multiple CPUs, GPUs and/or CPUs with multiple multi-core CPUs. The result is that the frame rate and execution time is speeded up substantially. Thread B is split into more parallel tasks, which makes the implementation of the physical camera pose estimation very effective.

After the first image/frame has been grabbed at start-up and transferred to the destination memory area in RAM, the physical camera pose can be estimated in this frame. After the pose estimation is accomplished, the camera image and the pose can be used to render virtual objects into the first image to get an augmented reality effect.

Thread A (TA), Thread B (TB) and Thread C (TC) are all running on one or more single-core CPUs, one or more multi-core CPUs and/or one or more GPUs or other specialised computing units. The tasks can be set specifically to be performed on certain CPUs/cores, but it is also possible to let the operating system (OS) decide the CPU to perform the thread tasks automatically.

Figure 2:
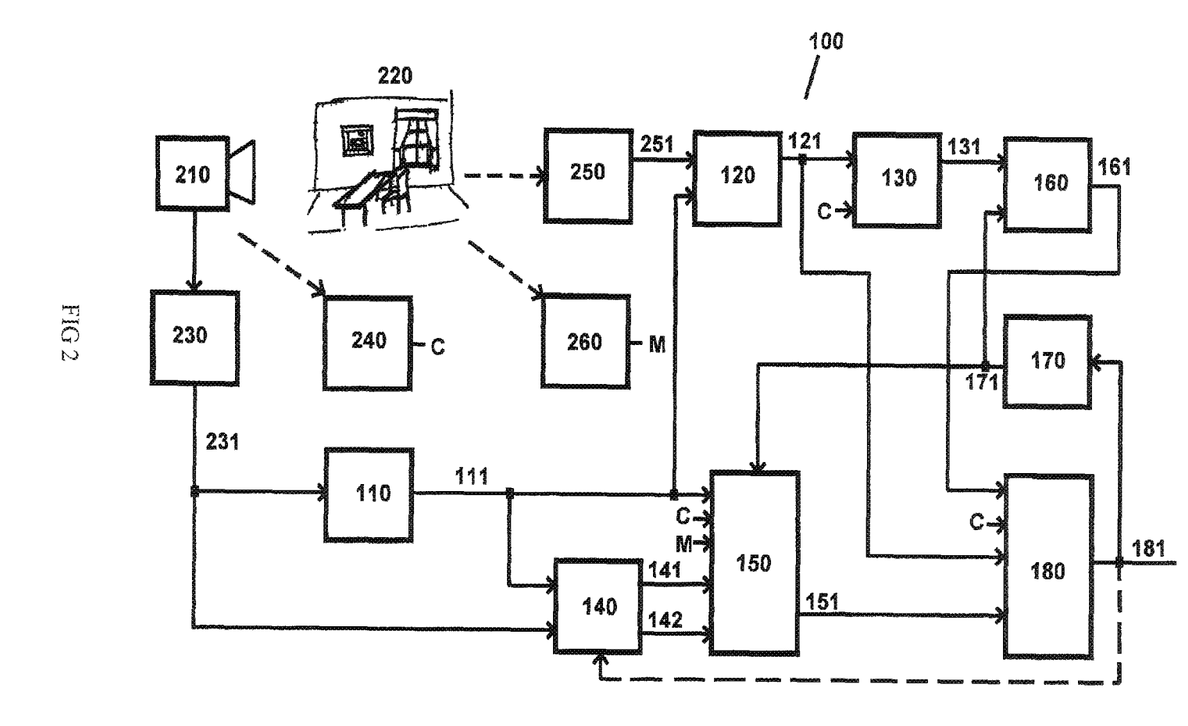
FIG. 2 is a block diagram illustration of the present invention.

An example of an apparatus incorporating an embodiment of the present invention is schematically illustrated by the block diagram of FIG. 2 of the accompanying drawings.

The apparatus is provided with an input for receiving from a frame grabber 230 image data 231 of an image frame representing a two-dimensional (2D) image of a scene 220, typically obtained by a camera 210 and acquired by the frame grabber, an input for receiving camera data C, such as for example camera lens data, principal point, etc., from a camera data source 240, an input for receiving three-dimensional (3D) scene model data M from a scene model data source 260, and an input for receiving from a scene data source 250 pre-recorded scene data 251, such as for example 3D feature points data obtained by a processing of pre-recorded scene images. The apparatus is arranged to compute, based on information provided to one or more of the aforementioned inputs, and output a current estimate 181 for the geometrical 3D pose of the camera in respect of the scene being imaged by the camera. Advantageously, a geometrical 3D camera pose estimator of the apparatus is arranged so as to determine a "level of confidence" of the geometrical 3D camera pose estimate, and may be enabled to output a 3D pose score value as an indication of the level of confidence at which the geometrical 3D camera pose estimate was computed.

The apparatus further includes a candidate 2D key point detector 110, adapted to receive and process the image data 231 received from the frame grabber 230, the candidate 2D key point detector being arranged to detect specific image features that may represent key points of which the 3D location is considered known, and to output data representing detected specific image features as candidate 2D key points 111. Examples of such specific features are features of the scene where scene objects distinct colours appear, or a part of the scene where the scene exhibits a clearly identifiable single geometric feature or set of geometric features, such as a corner or an edge.

The apparatus further includes a detected 3D observations detector 120, adapted to receive the candidate 2D key points 111 and the pre-recorded scene data 251, the detected 3D observations detector being arranged to output a detected 3D observation 121 for each candidate 2D key point that is considered to have a corresponding 3D feature present in the pre-recorded scene data. The detected 3D observations detector is furthermore arranged to determine a "level of confidence" of the detected 3D observations, and may be enabled to output a score value as an indication of the level of confidence at which the detected 3D observation was determined.

The apparatus further includes a detected 3D camera pose estimator 130, adapted to receive the detected 3D observations 121 and the camera data C, the detected 3D camera pose estimator being arranged to determine, by computation, and output a detected 3D camera pose estimate 131. Advantageously, the detected 3D camera pose estimator is arranged so as to determine a "level of confidence" of the detected 3D camera pose estimate, and may be enabled to output a pose score value as an indication of the level of confidence at which the detected 3D camera pose estimate was computed.

The apparatus further includes a first storage means 140 for storing grabbed frame image data 231 and candidate 2D key points 111, adapted to receive the frame grabber image data of the image frame representing the two-dimensional (2D) image of the scene, the first storage means being arranged to detect the output 181 of the current estimate for the geometrical pose of the camera in respect of the scene and in response thereto output a stored grabbed frame image data 141 and stored candidate 2D key points 142 on which a previous geometrical camera pose estimate was based.

The apparatus further includes a second storage means 160 for storing and output a previous estimate 161 for the geometrical pose of the camera, that was presented on the output of the apparatus prior to the output current estimate 181 for the geometrical pose of the camera in respect of the scene.

The apparatus further includes a tracked 3D observations detector 150, adapted to receive the stored previous estimate 141 for the geometrical pose of the camera, the candidate 2D key points 111, the stored grabbed frame 141 and candidate 2D key points 142 on which a previous geometrical camera pose estimate was based, the camera data C and the three-dimensional (3D) scene model data M, the tracked 3D observations detector being arranged to output a tracked 3D observation 151 for each candidate 2D key point that is considered to have a corresponding 3D feature present in the previous geometrical camera pose estimate. The tracked 3D observations detector is furthermore arranged to determine a "level of confidence" of the tracked 3D observations, and may be enabled to output a score value as an indication of the level of confidence at which the tracked 3D observation was determined.

The apparatus further includes a 3D camera pose estimate selector 170, having inputs to receive the stored previous geometrical 3D camera pose estimate 161 and the detected 3D camera pose estimate 131, respectively, and an output for providing a selected 3D camera pose estimate 171. Advantageously, the 3D camera pose estimate selector is arranged so as to provide on an output as the selected 3D camera pose estimate one of the 3D pose estimates received on the inputs, or a combination thereof, in response to score values presented with the 3D camera pose estimates received on respective inputs.

The apparatus further includes a geometrical 3D camera pose estimator 180, adapted to receive the selected 3D camera pose estimate 171, the detected 3D observations 121, the tracked 3D observations 151, and the camera data C, the geometrical 3D camera pose estimator being arranged to determine, by computation, and output a current geometrical 3D camera pose estimate 181. Advantageously, the geometrical 3D camera pose estimator is arranged so as to determine a "level of confidence" of the current geometrical 3D camera pose estimate, and may be enabled to output a pose score value as an indication of the level of confidence at which the current geometrical 3D camera pose estimate was computed.

3.4 Physical Camera Pose Estimation (Thread B)

In the following, advantageous computer implementations of the present invention are explained.

The physical camera pose estimation method for computer implementation of the invention, herein also referred to as the physical camera pose estimation algorithm, is advantageously implemented as one of two modes, that should be selected from start-up: A) the "combined" mode, and B) the "split" mode. Thread B distributes its tasks into different threads and thread tasks for optimized run-time performance on computers with multiple single-core CPUs and/or -GPUs, one or more multi-core CPUs and/or -GPUs.

The "combined" mode runs part of the detection and tracking in parallel, then combining and processing the results for final numerical optimization. The "split" mode runs the detection and tracking more isolated, and the final results are analysed and processed as final camera pose. The implementation "combined" and "split" modes of the present invention are illustrated by the accompanying FIGS. 3 and 4, respectively.

Common for Combined Mode (A) and Split Mode (B)

3.4.1.1 Parameterization of Rotation and Translation (External Parameters)

When calculating re-projection error (and the Jacobian matrix) in our use of PROSAC and the numerical minimization (Levenberg-Marquardt) methods, the rotation is parameterized using an exponential map. The Rodrigues formula is used to convert to- and from rotation matrix to exponential map before and after estimations.

During numerical minimization, the state vector is a 6-element vector containing the rotation and translation as exponential map and translation vector.

To avoid singularities in the exponential map, we check if the length of the exponential map (vector) $\|w\|$ is close to $2*\pi*n$, where $\pi$ is 3.14 and n is an integer larger than 0. If the length is close to $2*\pi*n$, it can be replaced by $(1-2*\pi/\|w\|)*w$, where w is the exponential map (From F. Sebastian Grassia. *Practical parameterization of rotations using the exponential map*. Journal of Graphics Tools, 3(3):29-48, 1998").

3.4.1.2 Detect Keypoints

Fresh, live images from the camera are searched for possible feature points/key points. These keypoints are candidate points to be used further in the detection and tracking. As illustrated by the accompanying figures, the detection of keypoints is computed for both tracking and detection.

3.4.1.3 Compensation for Lens Distortion

The images captured from the camera contain some lens distortion. In our system we compensate for radial and tangential distortion in the internal camera parameters, obtained through a pre-calibration of the camera and lens.

To compute and parameterize the internal camera parameters, in an advantageous embodiment of the present invention, the method described in "A flexible new technique for camera calibration" by Z. Zhang, see IEEE Transactions on Pattern Analysis and Machine Intelligence, 22(11):1330-1334, 2000, is employed.

To compensate for lens distortion, either the entire input images can be undistorted, or only the detected keypoints can be undistorted. Undistorting the entire image can be a time-consuming task, and it is more efficient to undistort the detected feature points.

If the distorted camera image will be used for overlaying virtual graphics, the virtual graphics will not match correctly with the background image. To compensate for this, the virtual graphics must be distorted according to the internal camera parameters. If the camera image is not used as a background in a video-see-through setup, this is not a problem.

3.4.1.4 Estimate Initial Pose

This task is performed in both modes, and consists of estimating a rough, initial pose based on keypoint matches against the database (detection).

See 0 for parameterization of the position and orientation used during initial pose estimation.

Steps to estimate the initial pose are:

1. Classify the keypoints detected in the image to get 2D-3D point correspondences. Advantageously, the present invention uses the algorithms for classification and training presented in a publication named "Randomized Trees for Real-Time Keypoint Recognition" by V. Lepetit, P. Lagger and P. Fua. Other feature point classification/detection methods might be suitable.
2. If 4 or more matches with score above a given threshold (e.g. 0.5) exists:
   a. Yes: Run the PROSAC algorithm.

The initial rough pose is used as a starting point for the numerical minimization, to ensure that the minimization algorithm finds the global minimum. With a wrong/bad initial pose, the minimization might end up in a local minimum, in other words an incorrect solution. To achieve an initial pose close to the global minimum it is important to set the proper constraints on the required re-projection error, the minimum number of inliers in the estimation of the rough initial pose. Maximum re-projection error should be between 5 and 25 pixels Minimum number of inliers should be from 15 to 40.

In our implementation, we have also added the possibility to specify that the minimum number of inliers is computed each time as a percentage of the total number of observations (both inliers and outliers). This makes the algorithm automatically adjust the requirements when many observations are present. The danger of enabling this feature is in case of many outliers. If the minimum percentage of inliers is too high, the PROSAC algorithm might fail to compute a pose with enough inliers.

3.4.1.5 Numerical Minimization

In a further advantageous embodiment of the present invention, use is made of the Levenberg-Marquardt algorithm for numerical minimization, but other methods might also be used.

The sum of re-projection errors are minimized during the numerical minimization. As in the PROSAC method, a robust estimator is also applied during calculation of the re-projection error to disregard outliers in the numerical minimization. Advantageously, the present invention uses a Tukey estimator, but other robust estimators can be used. In addition, motion model-observations are used to minimize the translation and rotation between the estimated pose in current and previous frame.

The description above yields for the numerical minimization subtasks for both mode A and B.

Combined Mode (A)

Figure 3:
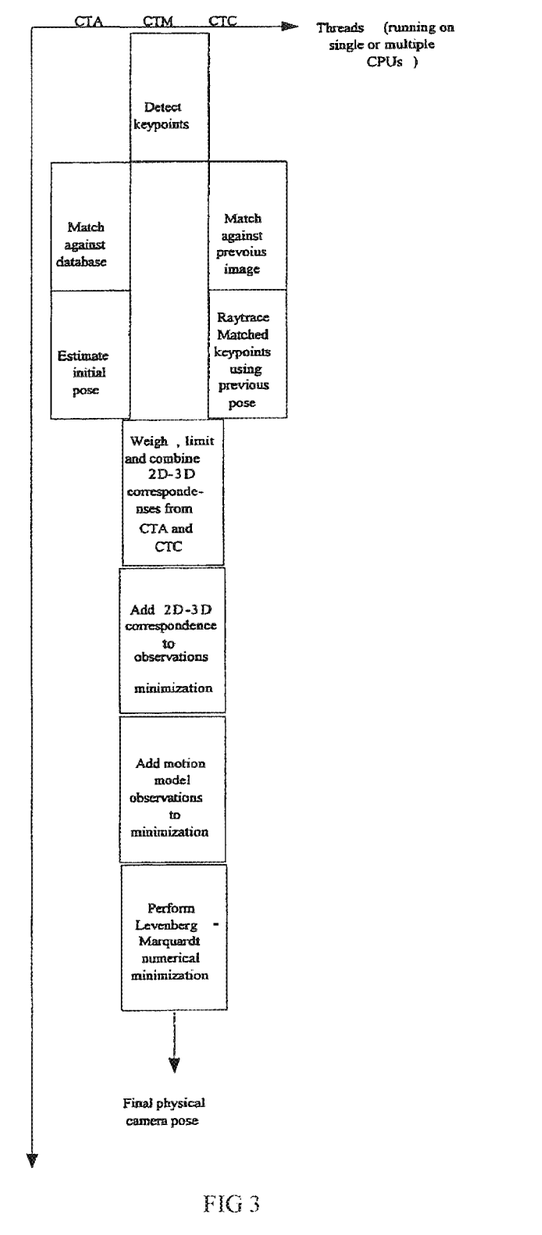
FIG. 3 is a flow chart illustrating the "combined" mode of the present invention.

This chapter explains in word the combined mode, with reference to FIG. 3.

Generally, it is assumed that "New frame" is undistorted, meaning that any camera/lens distortion has been compensated for.

For the case where only the 2D keypoints will be undistorted, the illustration should be slightly modified. However this is regarded that a computer vision engineer will be able to identify where to apply 2D keypoint undistortion.

The two procedures "Combine and pre-process 2D-3D correspondences" and "Weigh and prepare motion model observations" are independent of each other, and can be set up to be performed in parallel, in two different threads for further performance optimization. The two procedures are however not especially time consuming, and the overhead of splitting these tasks into different threads might be the same or more than what is gained by performing the tasks in parallel.

3.4.2.1 Detect Keypoints, Start Detection- and Tracking-Thread

After the keypoints have been detected, Combined Thread A (CTA) is started in parallel with Combined Thread C (CTC).

CTA performs the following:
1. Classify the keypoints detected in the current image with the pre-trained classification tree/database to get 2D-3D point correspondences, using the Lepetit-method.
2. Estimate initial pose based on the 2D-3D point correspondences.

CTC performs the following, if there has been a pose successfully computed earlier (last good pose):
1. Match the keypoints detected in the current image with keypoints detected in "last good frame".
   By applying a mean intensity threshold, it is possible to only accept matches between keypoints where the difference in mean intensity is below the given threshold. By setting a low value (e.g. 10 out of 255 possible), only keypoints with similar mean intensity will be accepted. This enhances the reliability of the keypoint matching.
2. Perform ray tracing on all keypoints with a correlation match score higher than a given threshold. The ray tracing computes the 3D positions of the matched keypoints by using previous' frame camera pose, the 3D model and the internal camera parameters.

An important feature to make our system automatically select when to rely only on "detection observations" from CTA, and when to also rely on "tracking observations" from CTC is implemented as following:

In the keypoint matching implementation used in the tracking thread (CTC) it is possible to set the maximum disparity in 2D keypoint position between frames. This allows us to limit the possible keypoints that can be matched depending on whether they are close to each other in the two frames. By setting the maximum disparity in the u- and v-direction to a low number, e.g. 10 pixels when the system is running at 20-30 frames per second, our system automatically depends only on observations from detection when the camera moves quickly. As soon as the camera is moving slower, the observations from frame-to-frame tracking is more and more influencing the numerical minimization, because more and more keypoint matches are accepted. In combination with other features of our system this helps to make it robust to fast camera movements and at the same time accurate with high repeatability with small camera movements.

3.4.2.2 Combine and Pre-Process 2D-3D Correspondences

The two sets of correspondences, or observations, from CTA and CTC have 2 different types of score. The detection-set (CTA) has a score given by the matching/classification against the pre-trained database, while the tracking-set (CTC) has a correlation matching score that tells how well the keypoint in current frame matched against previous frame. To make sure that the two types of observation scores are treated in a controlled manner, all the scores are normalized to make sure that a detection-observation (CTA) is equally "important" as a tracking-observation (CTC).

Further, based on the normalized scores, it is possible to "promote" or "degrade" one of the two types of observations by multiplying the normalized score with a scalar that makes the selected type of observations more or less "important".

Finally, there is a filtering performed that sets minimum and maximum numbers for the number of observations of one or the other set. Typically it might be desired to never allow maximum n observations from the detection-set (CTA), and maximum k observations from the tracking-set (CTC). This is done to further control the "importance" of the two types of observations.

After weighing and limiting/controlling the types of observations against each other, the observations are all added to the numerical minimization. If the pose in previous frame was not successfully computes, the tracking tasks (CTC) have not been executed, and only the detection observations from CTA will be added.

3.4.2.3 Weigh and Compare Motion Model Observations

Motion model observations are prepared. The motion model observations consist of the difference between translation and rotation or the camera pose along- and around the x, y and z axis in the current frame and previous frame, if a pose was estimated in previous frame. These observations will try to make the numerical minimization minimize the translation and rotation along- and around the x, y and z axis, meaning that they will try to damp the resulting pose based on the previous pose.

The motion model can also be an advanced predictive motion model that predicts motion in the new frame.

The weight of the motion model observations is set to a given value, which affects how much these observations affect the numerical minimization.

As for the re-projection error, a robust estimator is also used for the motion model observations. This means that e.g. very large movement along the x-axis between two consecutive frames is regarded as an outlier observation. The threshold for deciding inliers/outliers is set according to the frame-rate of the overall system, including how rapid the camera is expected to move.

3.4.2.4 Perform Numerical Minimization

The initially estimated pose is used as a starting point for the numerical minimization, which ensures that the final result is the actual/correct global solution. The 2D re-projection error in pixels will be minimized for the 2D-3D point correspondences and motion model observations will be minimized to obtain the best possible pose. For both 2D-3D point correspondences and motion model observations, there is a robust estimator implemented that ensures robustness against outliers.

The minimization runs for a limited number of iterations or until a satisfactory result has been obtained.

3.4.2.5 Store Current Camera Pose, Frame and 2D Keypoints

The post-processing for making ready for next frame is as following:

Was the pose successfully estimated, based on requirements to minimum number of inliers?
  a. Yes:
    i. Store the current frame, 2D keypoints and pose as "last good" frame, 2D keypoints and pose, for use in tracking thread in next frame.
    ii. Store the current pose as "Previous camera pose" to use for motion model observations in next frame.
  b. No: Mark "Previous camera pose" used for the motion model observations as invalid.

3.4.3 Split Mode (B)

Figure 4:
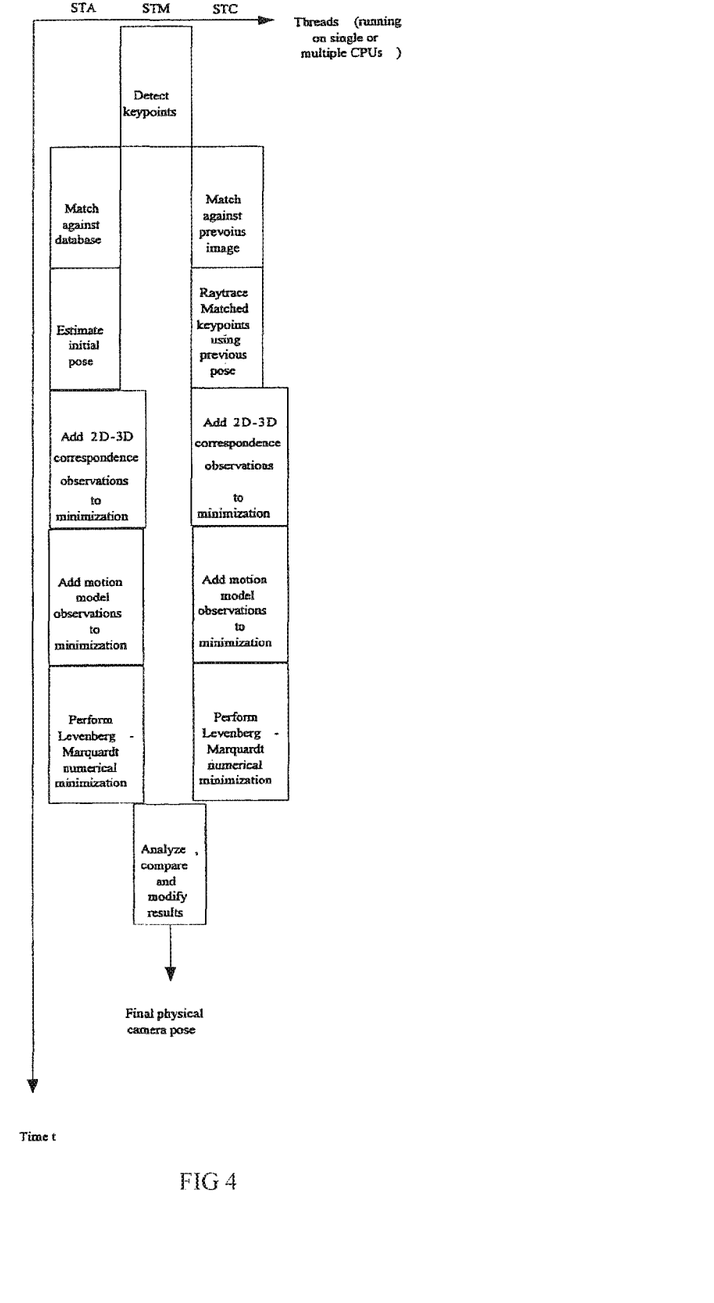
FIG. 4 is a flow chart illustrating the "split" mode of the present invention.
Figure 5:
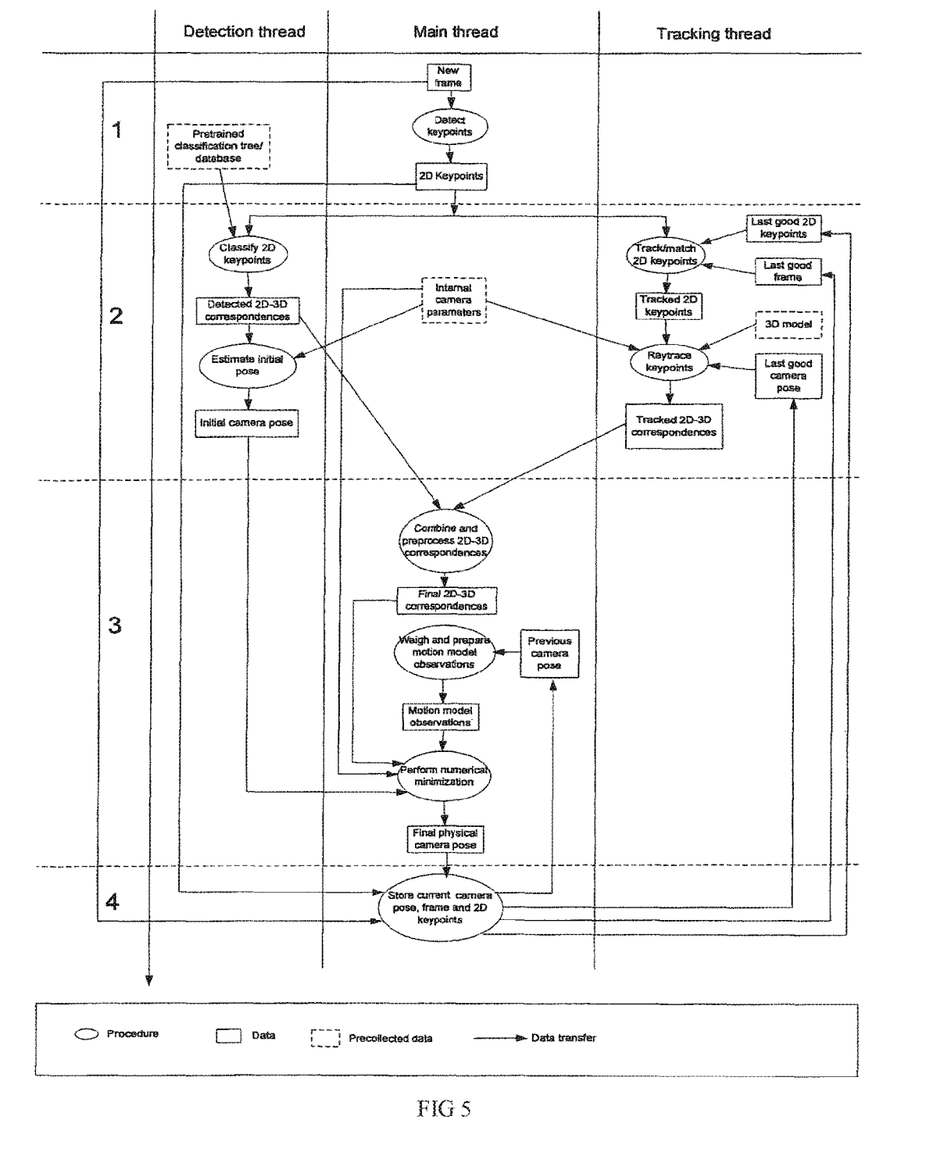
FIG. 5 is a flow chart illustrating an aspect of the present invention.

With reference to FIG. 4, the split mode will be explained. In the split mode, as in combined mode, the first step is to detect keypoints in the current image.

Next, the tasks are split into two threads, Split Thread A (STA) running the detection tasks and Split Thread C (STC) performing the tracking tasks.

STA performs the following:
1. Match keypoints detected in the current image with the pre-trained database to get 2D-3D point correspondences
2. Estimate initial pose based on the 2D-3D point correspondences
3. Limit, weigh and control the observations
4. Add the observations to the numerical minimization related to the detection
5. If the pose was successfully estimated in previous pose: Add motion model observations to the detection-minimization (as in combined mode)
6. Perform the numerical minimization using the initial pose as starting point, minimizing the 2D re-projection errors and the motion model observations (if added).

In parallel, STC performs the following, if the pose was successfully estimated in previous pose:
1. Match the keypoints detected in the current image with keypoints detected in previous image
2. Perform ray tracing on all keypoints with a correlation match score higher than a given threshold: Compute the 3D positions of the matched keypoints by using previous' frame camera pose and the 3D model
3. Add the observations to the numerical minimization related to the tracking
4. A motion model as in STA is added to the tracking-minimization (if previous pose was successfully estimated)
5. Perform the numerical minimization using the previous pose as starting point, minimizing the 2D re-projection errors and the motion model observations (if added)
    a. Instead of using the previous pose, it is possible to wait for STA to compute the initial pose, and use this as initial pose instead of previous pose. This provides some overhead in performance, but might lead to a better result during fast camera movements.

Each minimization ends up with a separate estimated physical camera pose, each having a number of inlier observations and total residual from the minimization. Steps are taken to analyse the "goodness" of the 2 poses. If the result from one of the minimizations is significantly better than the other, the best one is chosen as final result. If the results from the 2 minimizations are almost equally good, the average of the results is used. If desirable, a weighted average can be used to obtain the final result.

3.5 Further Improvements

The solution provided by the present invention relies on feature points, meaning corners, edges with high contrast etc. appearing in the image. This requires that the real scene contains texture to detect enough feature points in frames captured by a camera to estimate the camera pose. In a room with e.g. only white walls with no paintings or other objects/illustrations that adds texture and contrast to the captured frames, feature points should be provided.

By implementing edge detection in combination with a 3D model of the environment, the system should work also in this kind of environment. To integrate such an approach into our system, another thread/thread task should be implemented to run in parallel to ensure the same performance (frames per second).

This new thread task would produce another set of observations. These observations would typically be edges/lines in the captured frames. The numerical minimization would then minimize the distance between the lines detected/measured in the captured images and the lines in the 3D model of the environment projected to the screen using the currently estimated camera pose (current: the pose at each iteration of the minimization process).

In the combined mode, this would mean that there would then be four types of observations:
1. Detected 2D-3D point correspondences (minimize the 2D pixel re-projection error)
2. Tracked 2D-3D point correspondences (minimize the 2D pixel re-projection error)
3. Motion model observations (minimize the translation and rotation relative to previous frame, if the pose was estimated in previous frame)
4. New: Edge observations (minimize the distance between the edges in the captured images and the lines/edges in the 3D model projected to the screen using the current camera pose)

By adding the fourth type of observation, the system would be capable of functioning also in environments with little or no texture, but with edges/lines present. Lines/edges will typically be the edge between walls, wall and floor, wall and ceiling, doors and walls etc.

4 Definitions of Terms Used in the Disclosure of the Present Invention 4.1 Pose 3D position (x, y, z)+3D orientation (rotation around x, y and z). Orientation is often parameterized using rotation matrix, Euler angles, quaternions or exponential maps. Position is normally parameterized as a vector (3-dimensional or homogenous 4 dimensional).

4.2 Virtual Camera

Mathematical representation of a physical camera containing internal and external camera parameters.

4.3 Internal Camera Parameters

Focal length, image centre, resolution, lens distortion parameters (radial distortion, tangential distortion).

4.4 External Camera Parameters

Pose of the physical camera, given in a specific coordinate system.

4.5 Keypoint or Feature Point

Point of interest in an image. There are several keypoint detection algorithms available. A feature point is a corner, a rapid change of contrast, an edge or similar. There are several methods used for extracting feature points from an image. Our method detects corners, based on description in chapter 4.4.1 of "Monocular Model-based $3d$ Tracking of Rigid Objects", Foundations and Trends in Computer Graphics and Vision, Vincent Lepetit and Pascal Fua, 2005.

4.6 Numerical Minimization

Numerical minimization means the minimization of a mathematical function subject to constraints on its variables. An example of numerical minimization is the Levenberg-Marquardt method.

4.7 Levenberg-Marquardt

From Wikipedia.org: "The Levenberg-Marquardt algorithm provides a numerical solution to the mathematical problem of minimizing a function, generally nonlinear, over a space of parameters of the function. This minimization problem arises especially in least squares curve fitting. The Levenberg-Marquardt algorithm (LMA) interpolates between the Gauss-Newton algorithm (GNA) and the method of gradient descent." The LMA takes the best from GNA and gradient descent depending on the state of the minimization.

4.8 2D-3D Point Correspondence

A point detected in an image has a 2D position given in image pixel coordinates. The same point has a 3D position in the real world. When having a minimum of three points and their 2D-3D correspondences, it is possible to estimate the pose of the physical camera used to shoot the image (e.g. through the P3P algorithm).

4.9 Observation

When discussing numerical minimization, an example of an observation is a 2D-3D point correspondence. When using a motion model in combination with 2D-3D point correspondences to estimate physical camera pose, an observation can also be the change of position in one or any of the 3 axes, or the change of rotation around any of the 3 axes from previous to current iteration/frame.

4.10 Outlier

An invalid observation. When discussing 2D-3D point correspondences as observations, an outlier is a wrong 2D-3D correspondence, where the 3D position is falsely matched to the 2D position.

4.11 Inlier

An inlier is a observation.

4.12 Keypoint Database

A database of keypoints and their properties stored during a training phase.

4.13 Classification Tree a tree-like hierarchical structure containing several tests that tries to classify, in our case, keypoints/feature points. The trees are used "upside down", meaning that each keypoint is "dropped down" the tree, starting from the root and ending up in the leaves. In each node, there is a test that sends the keypoint down one branch of another. Finally the keypoint reaches a leaf (the end of a branch). This branch contains information needed to identify the keypoint. For information on how to use classification trees for keypoint recognition, see: disclosure by V. Lepetit, P. Lagger and P. Fua, titled "Randomized Trees for Real-Time Keypoint Recognition", accepted to Conference on Computer Vision and Pattern Recognition, San Diego, Calif., June 2005.

4.14 PROSAC with Robust Estimator

PROSAC is an algorithm for robust fitting of models in the presence of many data outliers. In our case, we use PROSAC to estimate a rough initial camera pose, where many of the observations (2D-3D point correspondences) are outliers.

Given a set of 2D-3D point correspondences as observations, the steps of our PROSAC implementation are:
1. Sort the observations according to their score, matches with highest scores on the top
2. Set n to 2, where n is the number of observations from the top of the array of observations to choose from.
3. Set n=n+1.
4. If n is larger than the number of observations, quit with failure. A satisfactory initial pose has not been detected with the given requirements to minimum re-projection error and minimum number of inliers.
5. Pick 3 random observations from the top of the array, limited to the n top rows.
6. Compute the camera pose using P3P with the 3 randomly selected observations as input. To avoid singularities, the resulting rotation matrix from P3P is converted to an exponential map. For information about the exponential map. Other algorithms than the P3P might be suited for computing the camera pose.
7. For all observations in the array:
    a. Compute the re-projection error using the currently computed camera pose
    b. Apply a robust estimator to disregard outliers. Example: Tukey—If the re-projection error is larger than a given threshold (e.g. 15 pixels), then mark the observation as an outlier)
8. Calculate the residual by taking the sum of the re-projection error of all inliers divided on the number of inliers (residual=average re-projection error of inliers).
9. If the residual is lower than the lowest residual computed in previous iterations:
    a. Yes:
        i. Store the current camera pose as the best pose and store the corresponding residual
        ii. Check if the number of inliers is higher or equal to a given number of inliers (e.g. 20 inliers)
            1. No: Repeat step 3 to 7
            2. Yes: Accept the pose computed in step 4 as the initial pose and quit in success.
    b. No: Repeat step 3 to 7

For more information on PROSAC, see Matching with PROSAC—Progressive Sample Consensus, Chum, Ondřej, Matas, Jiří CVPR 2005.

4.15 P3P

Perspective-Three-Point: A method for geometrically estimating e.g. the physical camera poses based on a minimum of three 2D-3D point correspondences when internal camera parameters are known. To ensure that the global solution is found, a fourth 2D-3D point correspondence is needed.

Figure 7:
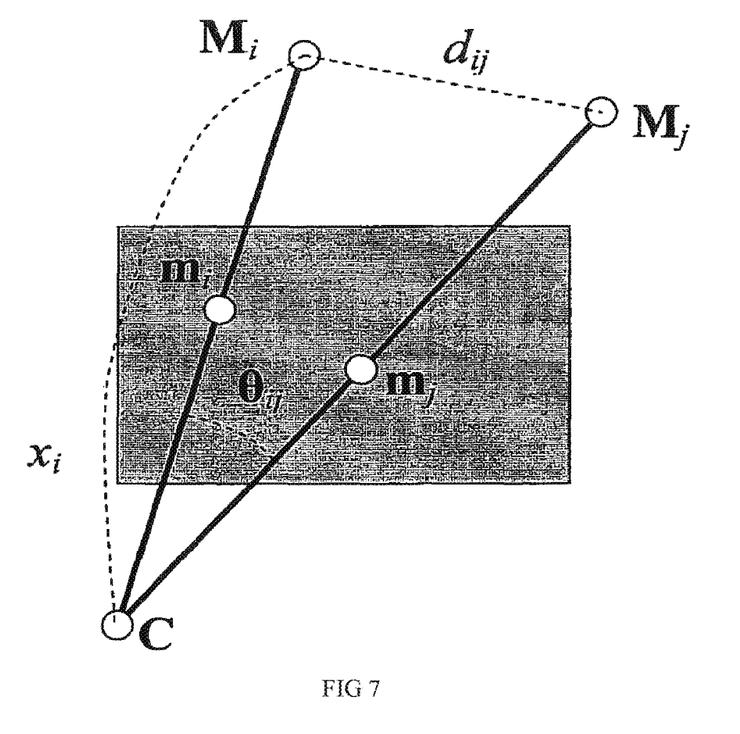
FIG. 7 is a diagrammatic illustration of perspective-three-point correspondence.

Reference is now made to FIG. 7 of the accompanying drawings to be considered for the following explanation of P3P.

Each pair of correspondences $M_i \leftrightarrow m_i$ and $M_j \leftrightarrow m_j$ gives a constraint on the (unknown) camera-point distances $x_i = \|M_i - C\|$ and $x_j = \|M_j - C\|$:

$$d_{ij}^2 = x_i^2 + x_j^2 - 2 x_i x_j \cos \theta_{ij}$$

where:
$d_{ij} = \|M_i - M_j\|$ is the (known) distance between $M_i$ and $M_j$;
$\theta_{ij}$ is the angle sustended at the camera center by $M_i$ and $M_j$.

Algorithm:
1. Solve for the distances $x_i$. Polynomial system:

$$d_{ij}^2 = x_i^2 + x_j^2 - 2 x_i x_j \cos \theta_{ij} \to f_{ij}(x_i, x_j) = x_i^2 + x_j^2 - 2 x_i x_j \cos \theta_{ij} - d_{ij}^2 = 0$$

2. The positions $M_i^C$ of the points Mi in the camera coordinates system can be computed
3. R and T are computed as the Euclidean displacement from the $M_i$ to the $M_i^C$.
    The best least-squares rotation is obtained in closed-form using quaternions (Horn, B.K.P.,
    Closed Form Solutions of Absolute Orientation Using Unit Quaternions, JOSA-A(4), No. 4, April 1987, pp. 629-642).

Definition, figures and description are from course 1 of "Selected Topics in Computer Vision" by Vincent Lepetit.

Our implementation of P3P is also based on X. S. Gao, X.-R. Hou, J. Tang, H.-F. Chang; "Complete Solution Classification for the Perspective-Three-Point Problem", IEEE Trans. on PAMI, vol. 25, No. 8, August 2003

4.16 Ray Tracing

When the physical camera pose and internal camera parameters are known, and a 3D model of the real environment is given, it is possible to calculate the 3D position of any 2D keypoint detected in the image. This is performed by mathematically describing a 3-dimensional vector that starts from the camera centre, passes through the 2D keypoint coordinate in the image, and collides with the 3D model of the real environment. This vector can also be looked at as a "ray", and the process is therefore called "ray tracing", since the ray is traced until a collision with the 3D model occurs. The collision point then gives the real-world 3D coordinates of the 2D keypoint detected in the image, given that the internal and external parameters of the camera are precomputed.

4.17 Motion Model

A motion model is a mathematical model that restricts and/or predicts the physical movement of an object, the physical camera etc. It uses information from current and previous iteration(s)/frame(s)/image(s) to improve the "correctness" of the currently estimated pose.

4.18 Drifting

Drifting is a common problem of frame-to-frame tracking. When starting at a frame with a good and accurate pose, several frames later the pose will have "drifted" away from the correct solution, meaning that the pose estimation results drifts further and further away from the correct solution as time goes (as future frames are processed).

Drifting occurs because the basis of this kind of methods is to start at a given frame, and compute the pose in subsequent frames based on this "first frame". Each time a new frame is processed, some numerical errors and uncertainties are added to the estimated pose. The error is added on top of "itself" each frame, meaning that the impact of the error increases drastically after tracking for only a few frames.

4.19 Robustness

The ability to compute the camera pose under rough circumstances where the camera moves rapidly is partly or fully occluded, incorrect feature points/keypoints are used in the estimation etc.

4.20 Accuracy

In terms of pose estimation, accuracy is the ability to compute an accurate and correct physical camera pose.

4.21 Repeatability

In terms of pose estimation repeatability is the ability to compute an almost identical physical camera pose in subsequent frames/images where the camera moves only a little and the actual/real pose only changes with small values.

4.22 Detection or Object Detection

Detection or object detection is the process of detecting an object (or a set of keypoints belonging to an object) in individual frames not requiring information from previous frames to be estimated.

4.23 Tracking or Frame-to-Frame Tracking

The process of performing frame-to-frame camera tracking using previously estimated camera pose for calculating camera pose in new/future frames through keypoint matching is referred to as Tracking or frame-to-frame tracking.

This method uses the known pose in a frame to estimate the pose on the subsequent frames. There are various methods for finding the first known pose. The pose estimation in the following frames generally follows the procedure below.

1. Detect possibly good feature points and store them for use in next frame
2. In the next frame, detect new possibly good feature points.
3. If a pose was correctly estimated/given in previous frame: match feature points against previous frame.
4. For each matched feature point:
    a. Use the previous camera pose and internal parameters to compute the 3D position of the feature point, by performing a ray tracing from the previous pose's camera centre, through the 2D position of the feature point detected in previous frame, and into a 3D model of the environment.
    b. Use the 3D position found using the previous frame together with the 2D position of the same feature point in the current frame as basis for the pose estimation
5. Use all the matched feature points' 2D-3D point correspondences to estimate the physical camera pose in the current frame using numerical optimization method, e.g. Levenberg-Marquardt.
6. Repeat Step 2-5 until the algorithm fails. The algorithm will fail if it looses track, which occurs either if not enough matched keypoints has been found between the previous and current frame, or if the pose was incorrectly/not estimated in the previous frame.

Step 1 is the initialization step, where it is assumed that the camera pose is known. Steps 2 to 5 are repeated for each new frame, as long as the requirements for tracking are present. The requirements are that the pose was correctly estimated or given in previous frame, and more than four feature points must be matched between current and previous frame to be able to compute a valid pose.

4.24 Residual

"A residual is an observable estimate of the unobservable error. Residuals are observable; errors are not" (http://en.wikipedia.org/wiki/Errors_and_residuals_instatistics).

4.25 Keypoint Matching

There are several ways of matching keypoints between images. Example of procedure is explained in Z. Zhang, R. Deriche, O. Faugeras, and Q. Luong, "A robust technique for matching two uncalibrated images through the recovery of the unknown epipolar geometry" Artificial Intelligence, vol. 78, pp. 87-119, 1995. Our method uses matching that is based on proximity and intensity cross-correlation. To estimate motion, one can match sets of interest points mi and m'j extracted from two images taken from similar, and often successive, viewpoints. For each point mi in the first image, search in a region of the second image around location mi for point m'j. The search is based on the similarity of the local image windows centered on the points. The similarity is measured using the zero-normalized cross-correlation, which is invariant to affine changes of the local image intensities, and makes the procedure robust to illumination changes. To obtain a more reliable set of matches, we reverse the roles of the two images, and repeat the previous procedure. Only the correspondences mi↔m'j between points that chose each other are kept. (Description and method based on chapter 4.4.2 in "Monocular Model-based 3d Tracking of Rigid Objects", Foundations and Trends in Computer Graphics and Vision, Vincent Lepetit and Pascal Fua, 2005.

4.26 Re-Projection Error

The re-projection error is the distance between the measured/detected 2D coordinate of a feature point and the projected 2D coordinate of its corresponding 3D coordinate. The re-projection error can be written as:

$$\|A[R|T]M_i - m_i\|^2$$

Where A is the 3×3 internal camera parameter matrix, [R|T] is the transformation matrix (R: rotation matrix, T: translation vector), $M_i$ is the 3D position of the feature point and $m_i$ is the measured/detected 2D coordinate of the feature point.

$$A: \begin{vmatrix} fx & 0 & cx \\ 0 & fy & cy \\ 0 & 0 & 1 \end{vmatrix}$$

Where fx, fy is the focal length and cx, cy is the principal point (image center).

4.27 Minimization of the Re-Projection Error

By changing the external parameters every iteration of a numerical minimization, and storing the external parameters that provide the minimum average distance between all measured and projected 2D keypoints, the optimum result can be achieved. Every iteration the derivatives of the external parameters are also computed. The derivatives usually decides how—and how much—the external parameters should be changed for next iteration to obtain a smaller average re-projection error.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed herein as the best mode contemplated for carrying out this invention.

What is claimed is:

1. An apparatus for providing an estimate for a 3D camera pose relative to a scene from 2D image data of a 2D image frame provided by a camera, the apparatus comprising:
    one or more processors; and
    a memory coupled to the one or more processors and comprising computer readable instructions which, when executed by the one or more processors, cause the one or more processors to:

obtain, from a detection thread, detected 2D-3D point correspondences between a current image and a previous image of a scene, obtain, from a tracking thread, tracked 2D-3D point correspondences between the current image and the previous image, obtain motion model observations by comparing the current image to the previous image, obtain edge observations in the current image and the previous image, and determine, in a primary thread, an estimate for a 3D camera pose relative to the scene according to the detected 2D-3D point correspondences, the tracked 2D-3D point correspondences, the motion model observations, and the edge observations by minimizing a distance between edges in the current image and the previous image and edges in a 3D model of the environment projected to a screen based on a previous camera pose.

2. The apparatus according to claim 1, wherein minimizing the distance between the edges in the current image and the previous image and the edges in the 3D model comprises numerically minimizing a 2D pixel re-projection error of the detected 2D-3D point correspondences.

3. The apparatus according to claim 1, wherein minimizing the distance between the edges in the current image and the previous image and the edges in the 3D model comprises numerically minimizing a 2D pixel re-projection error of the tracked 2D-3D point correspondences.

4. The apparatus according to claim 1, wherein minimizing the distance between the edges in the current image and the previous image and the edges in the 3D model comprises numerically minimizing a translation and rotation relative to the previous frame based on the notion model observations.

5. The apparatus according to claim 1, wherein minimizing the distance between the edges in the current image and the previous image and the edges in the 3D model comprises numerically minimizing a distance between the edges in the current image and the previous image and the edges in the 3D model projected to the screen.

6. The apparatus according to claim 1, wherein the edge observations are obtained by an observation thread, which is different from the detection thread and the tracking thread.

7. The apparatus according to claim 1, wherein the detected 2D-3D point correspondences, the tracked 2D-3D point correspondences, the motion model observations, and the edge observations are weighted, limited and controlled against each other.

8. The apparatus according to claim 1, wherein a Levenberg-Marquard algorithm is applied in the minimizing the distance between the edges in the current image and the previous image and the edges in the 3D model projected to the screen.

9. The apparatus according to claim 1, wherein a robust estimator is applied in the minimizing the distance between the edges in the current image and the previous image and the edges in the 3D model projected to the screen.

10. The apparatus according to claim 9, wherein the robust estimator comprises a Tukey estimator.

11. The apparatus according to claim 1, wherein the 2D image data is stored in a circular memory buffer in system RAM of the apparatus.

12. The apparatus according to claim 1, wherein the 2D image data is obtained in a separate thread than the detection thread and the tracking thread.

13. A non-transitory computer-readable medium comprising computer readable code executable by one or more processors to:

obtain, from a detection thread, detected 2D-3D point correspondences from 2D image data of a scene provided by a camera, obtain, from a tracking thread, tracked 2D-3D point correspondences from the 2D image data, obtain motion model observations from the 2D image data, obtain edge observations from the 2D image data, and determine, in a primary thread, an estimate for a 3D camera pose for the camera relative to the scene according to the detected 2D-3D point correspondences, the tracked 2D-3D point correspondences, the motion model observations, and the edge observations by minimizing a distance between edges in 2D images, obtained based on the 2D image data, and edges in a 3D model projected to a screen.

14. The non-transitory computer-readable medium of claim 13, wherein minimizing the distance between the edges in the 2D images and the edges in the 3D model comprises numerically minimizing a 2D pixel re-projection error of the detected 2D-3D point correspondences.

15. The non-transitory computer-readable medium of claim 13, wherein minimizing the distance between the edges in the 2D images and the edges in the 3D model comprises numerically minimizing a 2D pixel re-projection error of the tracked 2D-3D point correspondences.

16. The non-transitory computer-readable medium of claim 13, wherein minimizing the distance between the edges in the 2D images and the edges in the 3D model comprises numerically minimizing a distance between edges in the 2D images and the edges in the 3D model projected to the screen.

17. The non-transitory computer-readable medium of claim 13, wherein the edge observations are obtained by an observation thread, which is different from the detection and tracking threads.

18. The non-transitory computer-readable medium of claim 13, wherein the detected 2D-3D point correspondences, the tracked 2D-3D point correspondences, the motion model observations, and the edge observations are weighted, limited and controlled against each other.

19. A method comprising:

obtaining, from a detection thread, detected 2D-3D point correspondences from 2D image data of a scene provided by a camera, obtaining, from a tracking thread, tracked 2D-3D point correspondences from the 2D image data, obtaining motion model observations from the 2D image data, obtaining edge observations from the 2D image data, and determining, in a primary thread, an estimate for a 3D camera pose for the camera relative to the scene according to the detected 2D-3D point correspondences, the tracked 2D-3D point correspondences, the motion model observations, and the edge observations by minimizing a distance between edges in 2D images, obtained based on the 2D image data, and edges in a 3D model projected to a screen.

20. The method of claim 19, wherein the detected 2D-3D point correspondences, the tracked 2D-3D point correspondences, the motion model observations, and the edge observations are weighted, limited and controlled against each other.

* * * * *

UNITED STATES PATENT AND TRADEMARK OFFICE
CERTIFICATE OF CORRECTION

PATENT NO.       : 10,033,985 B2
APPLICATION NO.  : 13/900158
DATED            : July 24, 2018
INVENTOR(S)      : Torbjorn Engedal It is certified that error appears in the above-identified patent and that said Letters Patent is hereby corrected as shown below:

In the Claims

Claim number 4, at Column 19, Line number 36, replace the word "notion" with -- motion --

Signed and Sealed this
Eleventh Day of September, 2018

Andrei Iancu
*Director of the United States Patent and Trademark Office*